(12) United States Patent
Peluso et al.

(10) Patent No.: US 7,415,088 B2
(45) Date of Patent: Aug. 19, 2008

(54) MULTI-STANDARD BASEBAND RECEIVER

(75) Inventors: Vincenzo Filip Andre Peluso, San Diego, CA (US); Seyfollah Bazarjani, San Diego, CA (US); Peter Jivan Shah, San Diego, CA (US); James Jaffee, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 943 days.

(21) Appl. No.: 10/123,841

(22) Filed: Apr. 15, 2002

(65) Prior Publication Data

US 2003/0050085 A1    Mar. 13, 2003

Related U.S. Application Data

(60) Provisional application No. 60/316,489, filed on Aug. 31, 2001.

(51) Int. Cl.
*H04L 7/00* (2006.01)

(52) U.S. Cl. .................... 375/355; 375/316; 455/160.1; 348/725; 348/731

(58) Field of Classification Search ................ 375/316, 375/355, 216; 455/160.1; 348/731, 725
See application file for complete search history.

(56) References Cited

U.S. PATENT DOCUMENTS

| | | | | | |
|---|---|---|---|---|---|
| 4,695,792 | A | * | 9/1987 | Roy | ......................... 324/76.82 |
| 4,831,378 | A | | 5/1989 | Etienne et al. | |
| 5,612,975 | A | * | 3/1997 | Becker et al. | ............... 375/319 |
| 5,673,293 | A | * | 9/1997 | Scarpa et al. | ............... 375/321 |
| 5,721,756 | A | * | 2/1998 | Liebetreu et al. | ............ 375/344 |
| 5,987,070 | A | * | 11/1999 | Fimoff et al. | ............... 375/286 |
| 6,005,506 | A | * | 12/1999 | Bazarjani et al. | ............ 341/143 |
| 6,134,430 | A | * | 10/2000 | Younis et al. | ............... 455/340 |
| 6,223,053 | B1 | | 4/2001 | Friedmann et al. | |
| 6,697,438 | B2 | * | 2/2004 | Doetsch et al. | ............. 375/316 |
| 2002/0055343 | A1 | * | 5/2002 | Stetzler et al. | ............. 455/260 |

FOREIGN PATENT DOCUMENTS

| | | |
|---|---|---|
| EP | 0314873 | 5/1989 |
| EP | 1098449 | 5/2001 |
| WO | 9923761 | 5/1999 |
| WO | 0041322 | 7/2000 |

* cited by examiner

*Primary Examiner*—Temesghen Ghebretinsae
(74) *Attorney, Agent, or Firm*—George C. Pappas; Alan C. Gordon; Thomas R. Rouse

(57) ABSTRACT

Techniques for processing incoming signals conforming to a plurality of standards or communication formats with a single baseband receive section are disclosed. In one aspect, a plurality of analog processing components are adjusted in response to a format select signal, set according to one of a plurality of supported formats or standards. In another aspect, the operating mode of an A/D converter is tuned in response to the format select signal. In yet another aspect, the response characteristics of a jammer filter are tuned in response to the format select signal. In yet another aspect, the adjustment of the plurality of analog processing components is carried out by varying the frequency of a sample clock in response to the format select signal. Various other aspects are also presented. These aspects have the benefit of allowing a single baseband receive section to be deployed to process analog signals conforming to a plurality of communications standards or formats, in a power and area efficient manner.

20 Claims, 5 Drawing Sheets

MULTI-STANDARD BASEBAND RECEIVER

RELATED APPLICATIONS

This application claims priority to pending Provisional application number 60,316,489, filed on Aug. 31, 2001.

FIELD

The present invention relates generally to communications, and more specifically to a novel and improved method and apparatus for baseband processing of received signals conforming to a plurality of communications standards or formats.

BACKGROUND

Communication systems are deployed to facilitate communication between one or more devices, according to a predetermined signaling process. The signaling processes often conform to a standard, whether the standard is proprietary or determined by an industry consortium. For example, wireless communication systems involve communication between a base station and a mobile unit through radio frequency (RF) transmission. These systems may be based on code division multiple access (CDMA), time division multiple access (TDMA), frequency division multiple access (FDMA), or some other modulation techniques. Example CDMA standards include (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) others. Other wireless systems, such as GSM, AMPS, and other TDMA systems are in use throughout the world. Additional wireless standards providing for various forms of wireless data connection include the IEEE 802.11 standard and Bluetooth.

In addition to wireless standards, there are standards for communication using wires or optical fiber. Each standard differs in at least one of a variety of ways, including frequency, bandwidth, modulation format, etc., and devices that communicate according a standard must support the various properties of that standard. Devices capable of supporting more than one standard are referred to as multi-mode or multi-standard devices. New standards emerge over time, and systems supporting various standards are deployed and active. Multi-standard devices allow a user to communicate in a broader geographical area, or with a greater variety of data speeds and features, than a device supporting only a single standard with its fixed set of features, and limited geographical deployment. As an example, in the field of wireless communications, nation-wide and world-wide roaming agreements between network operators deploying heterogeneous systems are driving demand for mobile stations which support the various standards deployed in their networks.

The baseband receive section in a receiver receives baseband analog signals and performs subsequent processing before generating digital output. Analog signals coming into the baseband receiver usually undergo a filtering operation to attenuate unwanted frequencies or noise, followed by an analog-to-digital (A/D) conversion.

In the past, baseband receivers have been designed to handle a single standard. Generalizing this approach for handling multiple standards may involve creating separate signal paths corresponding to each standard supported, each with its own circuitry. A byproduct of this approach may be that separate interfaces, each requiring programming for switching between the multiple supported modes may be required. Multiple signal paths, switches, registers, and interface software add complexity, cost, and power consumption that increase with the number of standards supported.

There is therefore a need in the art for a multi-standard baseband receiver that processes incoming signals conforming to a plurality of standards or communication formats in a cost, chip area, and power effective manner, with an interface that promotes programming efficiency and minimum complexity.

SUMMARY

Embodiments disclosed herein address the need for a multi-standard baseband receiver that processes incoming signals conforming to a plurality of standards or communication formats in a cost, chip area, and power effective manner. In one aspect, a plurality of analog processing components are adjusted in response to a format select signal, set according to one of a plurality of supported formats or standards. In another aspect, the operating mode of an A/D converter is tuned in response to the format select signal. In yet another aspect, the response characteristics of a jammer filter are tuned in response to the format select signal. In yet another aspect, the adjustment of the plurality of analog processing components is carried out by varying the frequency of a sample clock in response to the format select signal. Various other aspects are also presented. These aspects have the benefit of allowing a single baseband receive section to be deployed to process analog signals conforming to a plurality of communications standards or formats, in a power and area efficient manner.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
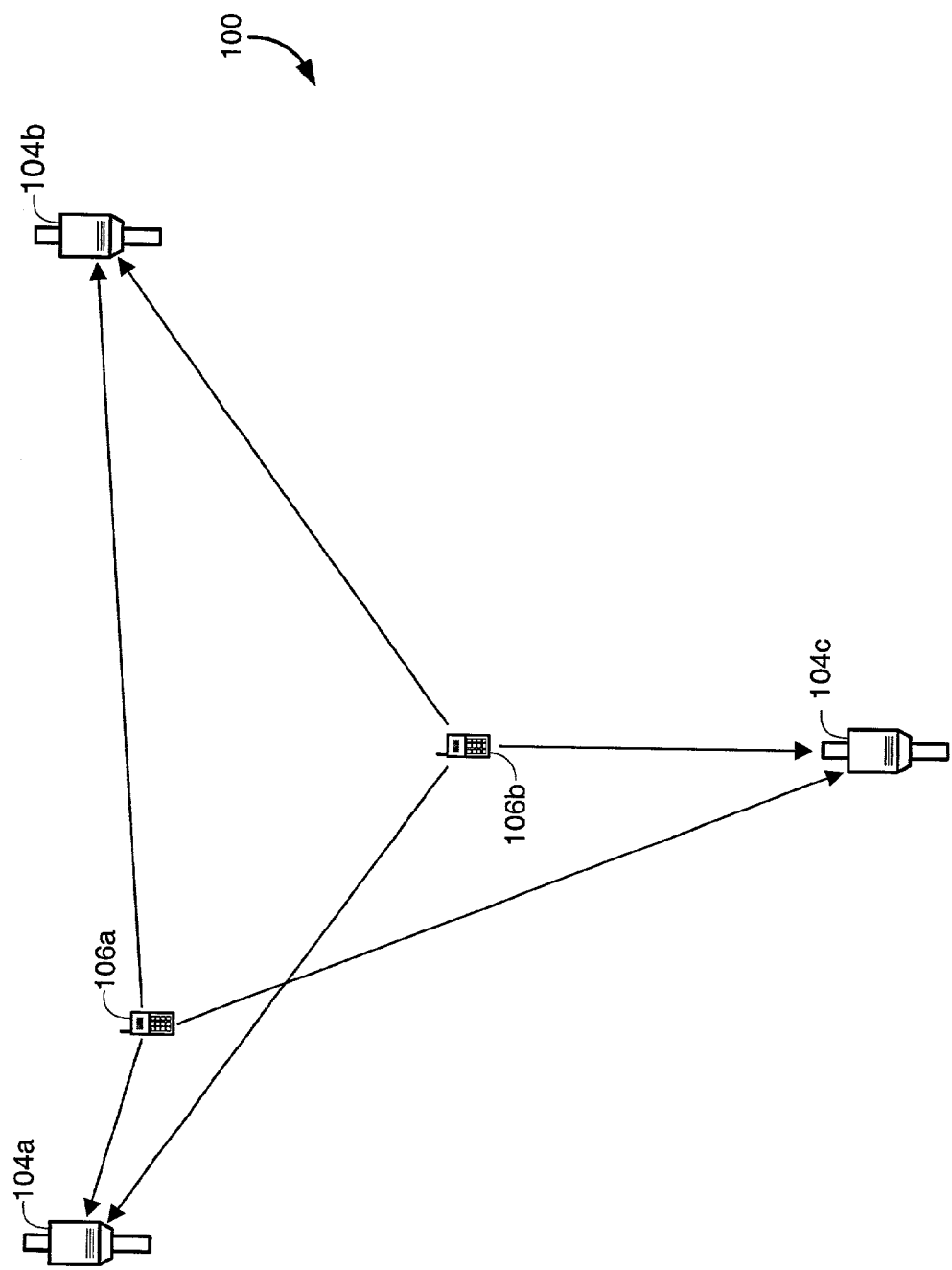
FIG. 1 is a general block diagram of a wireless communication system capable of supporting a number of users.

As stated above, communication systems are deployed to facilitate communication between one or more devices, according to a predetermined signaling process or format, which is often standardized. In the exemplary embodiment, the communication system deployed is a wireless system, although any communication system, including wireless, wireline, fiber, and the like, can be supported. FIG. 1 is a diagram of an exemplary wireless communication system 100 that may be designed to support one or more standards and/or designs (e.g., the W-CDMA standard, the IS-95 standard, the cdma2000 standard, the HDR specification, AMPS, GSM, other TDMA standards, Bluetooth, the 802.11 specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
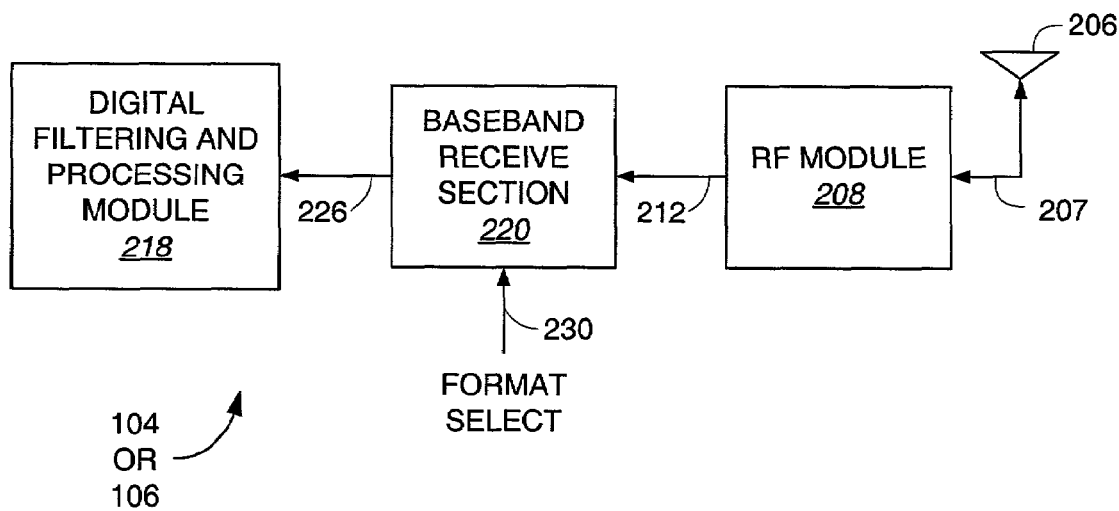
FIG. 2 depicts an exemplary embodiment of a receiver.

FIG. 2 shows a portion of a receiver in an exemplary base station 104 or mobile station 106. RF signals 207 are received at antenna 206 and delivered to RF module 208 for conversion to baseband. Various techniques for RF to baseband conversion are known in the art. The baseband analog signals 212 are provided to baseband receive section 220. Baseband receive section 220 converts baseband analog signals 212 to digital output 226, in accordance with the format select input. The format select input is used to configure baseband receive section 220 to process baseband analog signals 212 according to one of the plurality of standards supported. Digital output 226 can be further processed in digital filtering and processing module 218.

Digital filtering and processing module 218 may be a process in a digital signal processor (DSP), discrete hardware, or a combination of both. Depending on the type of communication system deployed, digital output 226 may be further demodulated and decoded to provide voice or data communications. Various techniques for voice and data demodulation, both wireless and wired, are known in the art. Details are not shown in FIG. 2.

Control for the various blocks may come from a DSP or other general purpose processor, with instructions for carrying out the processes described herein stored in a memory or other media attached to the DSP or other processor. The DSP or other processor may provide the format select input to baseband receive section 220, which indicates which communication standard or format should be currently used in receiving RF signals 207. Details are not shown in FIG. 2.

Figure 3:
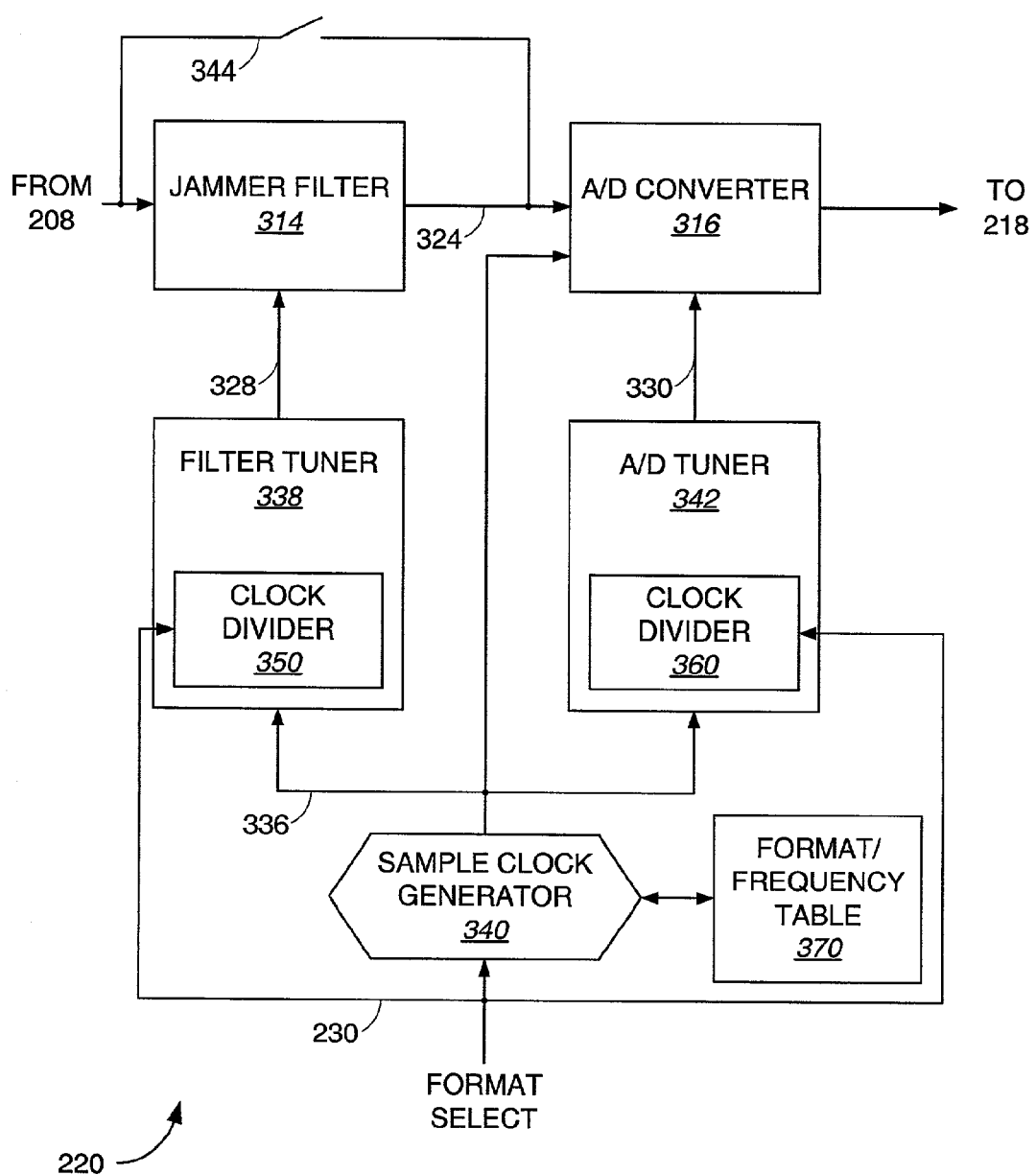
FIG. 3 depicts an exemplary embodiment of a baseband receive section of a receiver.

FIG. 3 illustrates an exemplary embodiment of a multi-standard baseband receive section 220. Jammer filter 314 receives analog baseband input signals 212 which at any one time conform to one of the plurality of supported standards or communication formats. After filtering the received baseband signals 212 in the analog domain, jammer filter 314 provides its analog output 324 to analog to digital (A/D) converter 316 for conversion to digital output 226. A/D converter 316 may be a switched capacitor device, such as a pipeline A/D converter or sigma-delta modulator. Various types of A/D converters may be used. The principles of the present invention apply to any switched capacitor device, techniques for which are known in the art. As used herein, the term A/D converter encompasses all switched capacitor devices as well as A/D converters not based on switched capacitor principles. The exemplary embodiment in FIG. 3 depicts two components that are dynamically adjusted by a reference clock, sample clock 336. Alternate embodiments may include any number of components, which may be deployed in any order.

In the embodiment shown in FIG. 3, the format select 230 input directs sample clock generator 340 to produce a sample clock 336, which corresponds to the standard or format currently in use, conformed to by analog baseband signals 212. Sample clock generator 340 may comprise or be connected with a format/frequency table 370. Table 1 depicts the relationship between a set of communication formats or standards and the bandwidth and sample clock frequencies associated with them. Table 1 comprises a list of exemplary communication standards, each associated with a value for format select 230. In the exemplary embodiment, format select 230 is a binary signal, although any signaling format can be used. A sample clock frequency, F1-F7, is associated with each supported communication format. The list of formats in Table 1 are exemplary, any number of formats or standards can be deployed. A bandwidth requirement, one of BW1-BW7, can be specified for each format, which may be a frequency cutoff for use with a low-pass filter or bandwidth for use with a bandpass filter, deployed as jammer filter 314 (described below). If a communication standard supports multiple frequencies or bandwidth requirements, more than one entry in Table 1 can be used to distinguish the various sets. Sample clock frequencies and bandwidth requirements in Table 1 need not be unique. In the exemplary embodiment, format/frequency table 370 may simply comprise a list of sample clock frequencies indexed by the associated format select number. As such, a change in format select will result in the associated frequency being generated by sample clock generator 340 as sample clock 336. Those of skill in the art will recognize that format/frequency table 370 can be implemented in various ways, including memory, registers, ROM, or combinational logic, as appropriate for the implementation.

TABLE 1

| Communication Format | Format Select | Bandwidth Requirement | Sample Clock Frequency |
|---|---|---|---|
| W-CDMA | 0 | BW1 | F1 |
| CDMA2000 3X | 1 | BW2 | F2 |
| GPS | 2 | BW3 | F3 |
| CDMA2000 1X | 3 | BW4 | F4 |

TABLE 1-continued

| Communication Format | Format Select | Bandwidth Requirement | Sample Clock Frequency |
|---|---|---|---|
| GSM | 4 | BW5 | F5 |
| AMPS | 5 | BW6 | F6 |
| TDMA | 6 | BW7 | F7 |
| ... | ... | ... | ... |

Sample clock 336 is delivered to filter tuner 338 and A/D tuner 342. Filter tuner 338 adjusts the mode of operation of jammer filter 314. Jammer filter 314 can filter out unwanted, spurious signals or noise. In various embodiments, the bandwidth or corner frequency, depending on the type of filter deployed, will be modified in accordance with the output 328 of filter tuner 338. In one embodiment, a control voltage 328 is output from filter tuner 338 in response to the sample clock 336. So, for example, when the frequency of sample clock 336 is increased or decreased, the frequency indicator voltage 328 is increased or decreased, respectively, resulting in a higher or lower corner frequency (e.g., the 3 dB cut-off frequency), respectively. Thus, the performance of the jammer filter 314 can be adapted to support a variety of communication standards or formats in response to a corresponding change in format select 230, or, in the exemplary embodiment, a change in sample clock 336 frequency.

In an alternative embodiment, jammer filter 314 and filter tuner 338 can be bypassed by means of optional bypass mode 344. The input 324 to A/D converter 316 can be selected as the output of jammer filter 314, or the direct input 212. Note that the bypass mode may contain RC anti-alias filtering (details not shown). A pure, unfiltered bypass mode may be deployed for testing purposes.

In similar fashion, A/D tuner 342 adjusts the mode of operation of A/D converter 316, such as the dynamic range, power consumption, or conversion rate, in response to sample clock 336. In the embodiment of FIG. 3, A/D converter 316 is adapted by changing the bias current, so A/D tuner 342 is a bias current tuner. A/D converters adaptable via other parameters than bias current can be deployed with a corresponding A/D tuner 342 (e.g., a bias voltage). In the exemplary embodiment, when the sample clock 336 is reduced, lower conversion rate and hence less operating current is required in A/D converter 316. Power consumption is lowered as a result. So, the dynamic range, speed, power consumption, and data conversion rate of the A/D converter can all be automatically tuned in response to a change in format select 230, or, in the exemplary embodiment, in response to a change in the sample clock 336 frequency.

Note that, in an alternate embodiment, multi-standard baseband receive section 220 may simply comprise A/D converter 316 and A/D tuner 342. Jammer filter 314, filter tuner 338, and optional bypass mode 344 would not be included. In such an embodiment, sample clock generator 340 may or may not be included.

In the exemplary embodiment, the mode selection of filter tuner 338 may comprise a clock divider 350. In FIG. 3, clock divider 350 is connected to format select 230. Format select 230, or a derivative or function thereof, can be used to divide sample clock 336 if filter tuner needs a divided clock to produce frequency indicator 328. Similarly, clock divider 360 can be included in A/D tuner 342 for producing the A/D mode 330 (such as bias current). A/D converter 316 may use sample clock 336 for sampling the analog input 324 and producing digital output 226, or may use the divided sample clock output from clock divider 360.

Those of skill in the art will apply the known principles for translating a reference, such as sample clock 336, into a frequency indicator 328 or bias current or other A/D converter mode 330. Frequency indicator 328 or A/D converter mode 342 may comprise one or more voltage or current inputs into jammer filter 314 or A/D converter 316, as necessary. One exemplary tuner implementation is a Phase Locked Loop (PLL), techniques for which are readily available to those of skill in the art.

Figure 5:
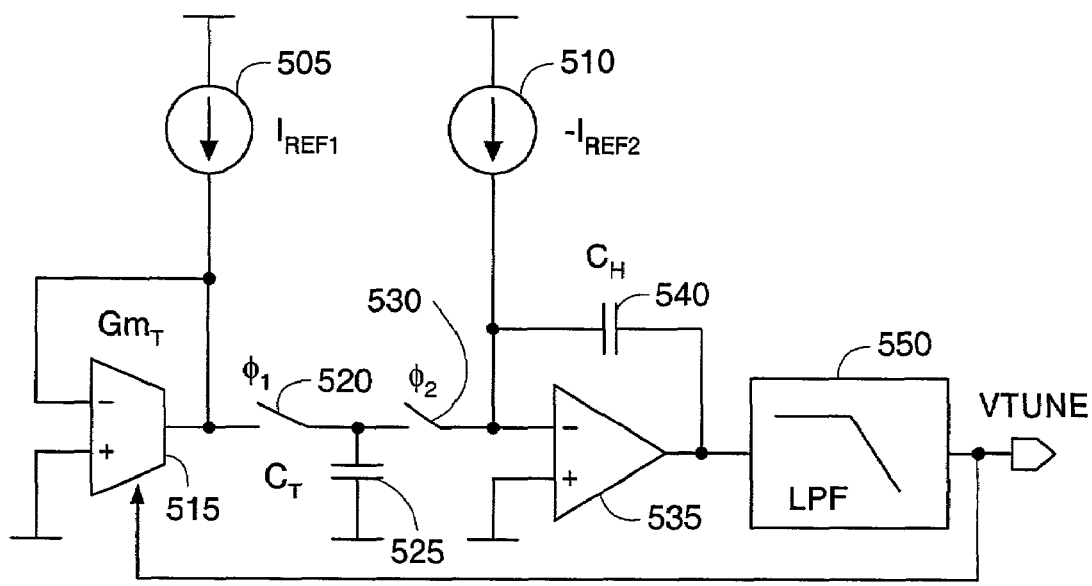
FIG. 5 illustrates an exemplary tuner configuration.

FIG. 5 depicts another exemplary tuner, which can be configured for deployment as filter tuner 338 or A/D tuner 342. $I_{REF1}$ 505 creates a reference voltage, $V_{REF}=I_{REF1}/Gm_T$ across transconductor 515 with transconductance $Gm_T$. Capacitor 525, with capacitance $C_T$, samples this reference voltage, switched by phase $\phi_1$ of the reference clock, which can be sample clock 336, and contains a charge, $Q_T=C_T*V_{REF}$. In the next phase of the reference clock, $\phi_2$, sampled with switch 530, this charge is integrated with an integrator made up of the operational amplifier 535 and capacitor CH 540. Also integrated is reference current—$I_{REF2}$ 510. The charge $Q_T$ and Iref2 have opposite sign and hence only the difference of the charge on $C_T$ and the integral of the current $I_{REF2}$ during one whole phase is integrated onto $C_H$. The output of operational amplifier 535 is sampled, low pass filtered in low pass filter 550 and used directly as the tuning voltage, VTUNE, of the transconductor 515. The loop exhibits negative feedback and will transient to the steady state situation where the charge on $C_T$ and the integral over the period of Iref2 are equal. This effectuates the following equation: $Gm_T/C_T$=reference clock frequency*$I_{REF1}/I_{REF2}$. $I_{REF1}$ and $I_{REF2}$ are constant currents, $C_T$ is a fixed capacitor value. It can hence be seen that a change in reference clock frequency causes a change in $Gm_T$. As an example, in a MOS device in strong inversion and saturation, $Gm_T$ is proportional to the square root of the current. Hence a change in reference clock frequency causes a change in current. Based on the particular implementation the feedback quantity can be either voltage or current.

Speed of operation in a switched capacitor (SC) circuit puts a requirement on the gain bandwidth product of the SC building blocks (e.g. integrator), generally expressed as and proportional to some effective gm/C ratio where the gm and C adhere to the components of the SC circuit. In a gm/C filter the filter bandwidth and/or corner frequency are generally proportional to an effective gm/C ratio where gm and C adhere to one or more components of the gm/C filter. In this way the gm/C filter bandwidth or corner frequency can be tuned to a clock used as reference. Note that $Gm_T$ and $C_T$ can be replica elements, designed to create a transconductance or capacitance, respectively, and their values are determined in relationship to the transconductance or capacitance of the various elements of the block to be tuned.

In alternate embodiments, filter tuner 338 and bias current tuner 342 can be changed directly in response to format select 230. Format select 230 can be connected to filter tuner 338 for use in selecting the appropriate frequency indicator 328, be it a voltage, current, or other indicator. Format select 230 can be connected to A/D tuner 342 for use in selecting the appropriate A/D mode 330. Sample clock generator 340 may be deployed to produce sample clock 336 for use in sampling by A/D converter 316.

Multi-standard baseband receive section 220 provides a single signal path to process baseband analog signals 212, conforming to any of a variety of standards. The processing is carried out using a single A/D converter 316, A/D tuner 342, and optional jammer filter 314 and filter tuner 338. A/D tuner 342 can adaptively change the operating conditions, such as the required speed, power consumption, dynamic range, and data conversion rate, of A/D converter 316 in response to a change in sample clock 336 frequency. Filter tuner 338 can place jammer filter 314 in the proper mode in response to a change in sample clock 336 frequency. The sample clock 336 frequency can be set according to the standard or format desired, according to format select 230. Thus, the appropriate frequencies, bias conditions, dynamic ranges, power consumption, and data conversion rates, corresponding to the particular standard or format desired, can be controlled with a simple change in sample clock 336 frequency. (Or, as described above, an alternative to clock based switching can be employed. In that case, the appropriate frequencies, bias conditions, dynamic ranges, power consumption, and data conversion rates, corresponding to the particular standard or format desired, can be controlled with a simple change in format select 230.) In contrast to a conventional deployment of multiple baseband receive sections, each selected to receive a subset of the supported standards, a single signal path allows area reduction in integrated circuit deployments. Furthermore, power can be reduced due to the reduction in circuitry as well as the proper tuning of the A/D converter 316.

Figure 4:
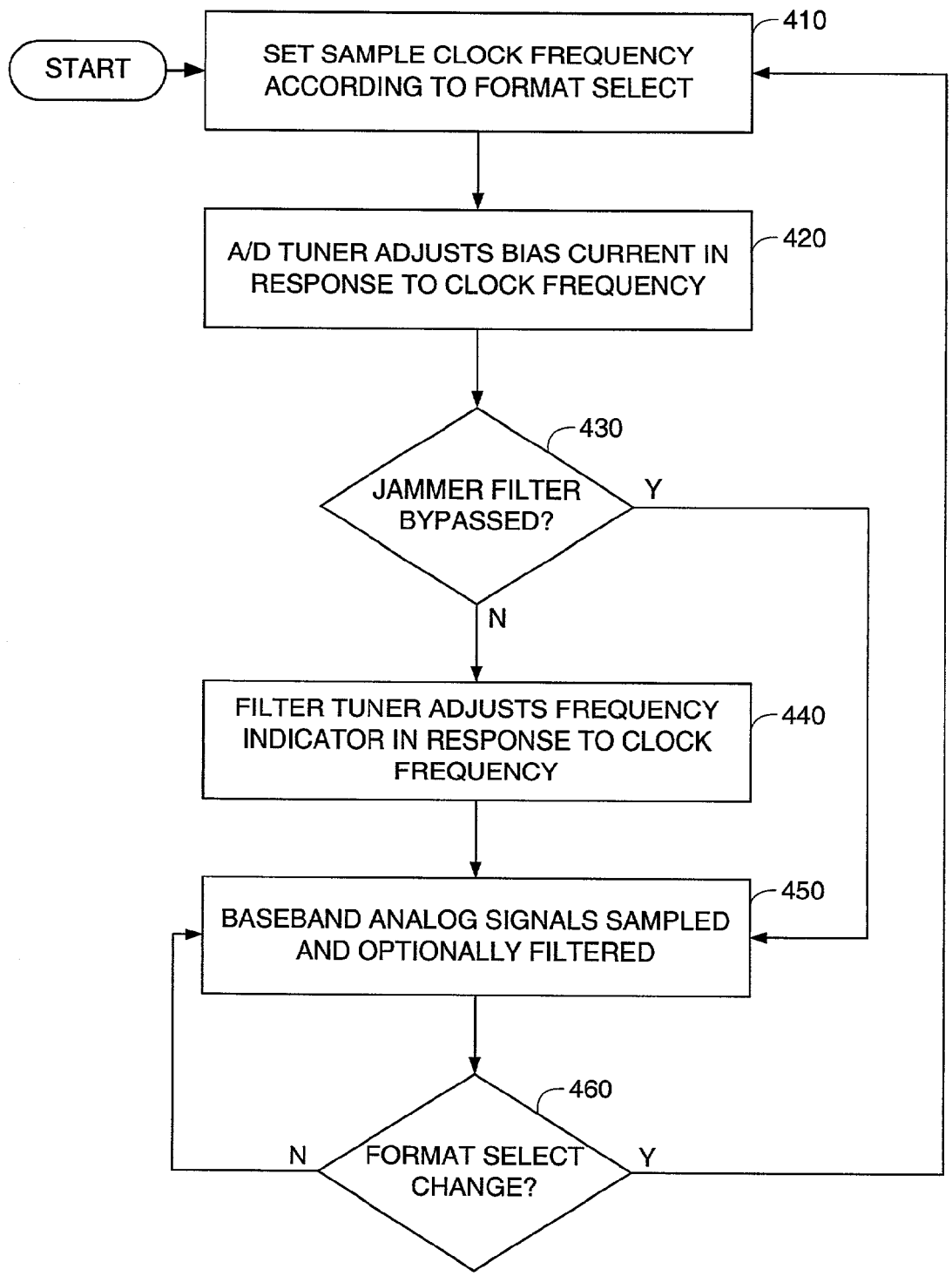
FIG. 4 depicts a flowchart of an embodiment of a method for receiving multiple standards with a single baseband receive section.

FIG. 4 depicts a flowchart of an embodiment of a method for receiving multiple standards with a single baseband receive section, such as multi-standard baseband receive section 220, shown in FIG. 3. The process starts in block 410, where the sample clock frequency is set according to the format select signal. Any method for mapping frequencies to format select values can be deployed. In one embodiment, a table of frequencies indexed according to format select values can be used, such as format/frequency table 370, shown in FIG. 3. Proceed to step 420.

In step 420, an A/D tuner adjusts the bias current in response to the clock frequency. As described above, other A/D mode settings can be deployed in addition to or in lieu of setting the bias current. Different A/D conversion rates require different bias currents to allow for proper conversion at the desired rate. Setting the bias current for each standard or format supported allows the bias current to be set no greater than required for each mode, thus reducing power. The A/D tuner, in this embodiment, adjusts directly in response to frequency changes on the sample clock. In an alternate embodiment, not shown, the sample clock may be divided (e.g., in response to the value of format select, or a function thereof), and the divided clock is used to generate the bias current or other A/D mode setting. Proceed to decision block 430.

In decision block 430, if the jammer filter is bypassed, proceed to step 450. If not, proceed to step 440. This step is optional, and need not be deployed if a bypass mode is not required. In an alternate embodiment, a jammer filter and associated tuner filter is not deployed, and so the bypass step 430 is not needed (nor is step 440, described below). In this case, the method is similar to the method shown in FIG. 4 with the jammer filter always bypassed.

In step 440, adjust a frequency indicator in response to the clock frequency with a filter tuner. In the exemplary embodiment, the frequency indicator is a voltage that sets the corner frequency in a low pass filter. Other embodiments may use a frequency indicator to set a bandwidth on a bandpass filter, and may use an indicator other than a voltage. The filter tuner, in this embodiment, adjusts directly in response to frequency changes on the sample clock. In an alternate embodiment, not shown, the sample clock may be divided (e.g., in response to the value of format select, or a function thereof), and the divided clock is used to generate the corner frequency voltage or other frequency indicator. Proceed to step 450.

In step 450, the incoming analog signal is filtered (except when the jammer filter is bypassed, or not deployed) with filter frequency characteristics set by the filter tuner. The incoming analog signal, whether filtered or not, is then sampled in an A/D converter whose bias current or other mode setting is determined by an A/D tuner. In the exemplary embodiment, the samples are generated at the sample clock frequency. If the sample clock is divided, perhaps for an input to the A/D tuner, the divided clock can alternately be used to produce the samples. The samples can be delivered for further processing and/or demodulation to produce data for use in voice or data applications (not shown). Proceed to decision block 460.

In decision block 460, if the format select changes, then the baseband receive section needs to be re-tuned for the new standard or format. Proceed to step 410 to repeat the process. While the format select remains unchanged, loop back to step 450 and continually process the incoming analog samples in the mode set up in the previously described steps.

Note that, if a format selection method other than variable clock frequency is deployed, as described above, the process can begin directly in step 420, where the bias current (or other A/D mode setting) is set in accordance with the format select signal. Then, in decision block 460, the flow returns to step 420 subsequent to a change in the format select signal.

It will be clear to those of skill in the art that the method steps just described can be interchanged without departing from the scope of the present invention.

The various embodiments described above deploy a baseband receive section comprising a single signal path for various wireless communication standards. In the exemplary embodiment, the signal path is tuned for each standard by controlling only the sample clock frequency. These embodiments provide elegantly interfaced, area efficient, low-power solutions for supporting multiple communication standards or formats in a receiver.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A receiver for processing an analog baseband signal conforming to one of a plurality of cellular communication formats, comprising:
   a plurality of analog baseband processing components for processing the analog baseband signal comprising a switched capacitor circuit, each component having adjustable mode of operation; and
   at least one control tuner for adjusting the mode of operation of the plurality of analog baseband processing components in response to a format select signal indicating a selected cellular communication format.

2. The receiver of claim 1, further comprising:
   a clock generator for generating a variable frequency sample clock in response to the format select signal, and wherein the at least one control tuner adjusts the mode of operation of the plurality of analog baseband processing components in response to the variable frequency sample clock.

3. The receiver of claim 1, wherein the plurality of cellular communication formats comprise a code division multiple access (CDMA) communication format, a wideband code division multiple access (W-CDMA) format; and a Global System for Mobile communications (GSM) format.

4. A receiver for processing an analog baseband signal conforming to one of a plurality of cellular communication formats, comprising:
   a plurality of analog baseband processing components for processing the analog baseband signal comprising a gm/C filter, each component having adjustable mode of operation; and
   at least one control tuner for adjusting the mode of operation of the plurality of analog baseband processing components in response to a format select signal indicating a selected cellular communication format.

5. The receiver of claim 4, further comprising:
   a clock generator for generating a variable frequency sample clock in response to the format select signal, and wherein the at least one control tuner adjusts the mode of operation of the plurality of analog baseband processing components in response to the variable frequency sample clock.

6. A receiver for processing an analog baseband signal conforming to one of a plurality of cellular communication formats, comprising:
   an analog to digital (A/D) converter having adjustable mode of operation and converting the analog baseband signal to a digital baseband signal;
   an A/D tuner coupled with the A/D converter, the A/D tuner adjusting the mode of operation of the A/D converter in response to a format select signal indicating a selected cellular communication format;
   an adjustable analog filter for filtering the analog baseband signal with a variable bandwidth determined by the format select signal; and
   a filter tuner for generating a frequency indicator that adjusts the variable bandwidth of the adjustable analog filter.

7. The receiver of claim 6, further comprising:
   a clock generator for generating a variable frequency sample clock in response to the format select signal indicating the selected cellular communication format, the A/D tuner for generating a bias current in response to the variable frequency sample clock, wherein the A/D converter converts the analog baseband signal to the digital base band signal in accordance with the bias current and samples the analog baseband signal in accordance with the variable frequency sample clock.

8. The receiver of claim 7, further comprising:
   a clock divider for generating a divided sample clock from the variable frequency sample clock in response to the format select signal, and wherein the bias current is generated in response to the divided sample clock.

9. The receiver of claim 8, wherein the A/D converter samples the analog baseband signal in accordance with the divided sample clock.

10. The receiver of claim 7, further comprising:
    a table of format/frequency pairings, coupled with the clock generator, wherein the variable frequency sample clock is set according to a frequency associated with the selected communication format indicated by the format select signal.

11. A method of processing an analog baseband signal conforming to one of a plurality of cellular communication formats, comprising:
    generating a control signal in response to a format select signal indicating a selected cellular communication format;
    adjusting operation of an A/D converter with the control signal;
    sampling the analog baseband signal with the A/D converter to obtain a digital baseband signal;
    setting a frequency of a sample clock according to the format select signal;
    adjusting a bias current in response to the sample clock; and
    sampling the analog baseband signal in accordance with the bias current at the sample clock frequency.

12. The method of claim 11, further comprising:
adjusting a filter tuner in response to the sample clock to produce a frequency indicator.

13. The method of claim 12, further comprising:
filtering the analog baseband signal in accordance with the frequency indicator.

14. The method of claim 13, further comprising:
bypassing the filtering in response to a bypass select signal.

15. The method of claim 11, wherein the sample clock frequency is set using a table of clock frequencies associated with the plurality of cellular communication formats and is set to a frequency associated with a selected communication format indicated by the format select signal.

16. The method of claim 11, further comprising:
changing the format select signal in response to a change in communication format.

17. A receiver for processing an analog baseband signal conforming to one of a plurality of cellular communication formats, comprising:
means for generating a control signal in response to a format select signal indicating a selected cellular communication format of a plurality of cellular communication formats;
means for sampling the analog baseband signal to obtain a digital baseband signal in accordance with the selected cellular communication format;
means for adjusting operation of the means for sampling with the control signal;
means for converting the format select signal to a frequency indicator; and
means for adjusting operation of an adjustable analog filter with the frequency indicator, the adjustable analog filter being located prior to the analog to digital (A/D) converter.

18. The receiver of claim 17, comprising:
means for setting frequency of a sample clock according to a the format select signal;
means for adjusting a bias current in response to the sample clock; and
means for sampling the analog baseband signal in accordance with the bias current at the sample clock frequency to obtain a digital baseband signal.

19. The receiver of claim 18 further comprising:
means for adjusting a filter tuner in response to the sample clock to produce a frequency indicator.

20. Processor readable media operable to perform the following steps:
generating a control signal in response to a format select signal indicating a selected cellular communication format of a plurality cellular communication formats;
adjusting operation of an A/D converter with the control signal;
converting the format select signal to a frequency indicator;
adjusting a variable bandwidth of an adjustable analog filter in response to the frequency indicator, the adjustable analog filter being located prior to the analog to digital (A/D) converter;
setting frequency of a sample clock according to the format select signal;
adjusting a bias current in response to the sample clock; and
directing sampling by the A/D converter of an analog baseband signal in accordance with the bias current at the sample clock frequency to obtain a digital baseband signal.

* * * * *